United States Patent
De La Cropte De Chanterac et al.

(10) Patent No.: US 10,599,199 B1
(45) Date of Patent: Mar. 24, 2020

(54) SYSTEMS AND METHODS FOR POWER MANAGEMENT AT DEVICE SHUTDOWN

(71) Applicant: Apple Inc., Cupertino, CA (US)

(72) Inventors: Cyril De La Cropte De Chanterac, San Francisco, CA (US); Michael Eng, San Jose, CA (US); Karen Eckert, San Jose, CA (US); Alessandro Pelosi, San Jose, CA (US); David M. Demuro, San Jose, CA (US); Stephen D. Sterz, San Jose, CA (US); Nicholas W. Ruhter, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 15/849,486

(22) Filed: Dec. 20, 2017

(51) Int. Cl.
  *G06F 1/28* (2006.01)
  *G06F 1/3296* (2019.01)
  *G06F 9/4401* (2018.01)

(52) U.S. Cl.
  CPC .............. *G06F 1/28* (2013.01); *G06F 1/3296* (2013.01); *G06F 9/4406* (2013.01)

(58) Field of Classification Search
  None
  See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,498,460 B1 | 12/2002 | Atkinson | |
| 6,690,387 B2 | 2/2004 | Zimmerman et al. | |

(Continued)

FOREIGN PATENT DOCUMENTS

| EP | 2 610 701 A1 | 7/2013 |
|---|---|---|
| EP | 2 610 701 A9 | 7/2013 |

(Continued)

OTHER PUBLICATIONS

Notice of Allowance dated Nov. 30, 2017, for U.S. Appl. No. 14/817,572, filed Aug. 4, 2015, 26 pages.

(Continued)

*Primary Examiner* — Danny Chan
(74) *Attorney, Agent, or Firm* — Kubota & Basol LLP

(57) ABSTRACT

A method is disclosed. The method can include receiving a command to shut down an electronic device based on a measurement of power delivery to the electronic device. After receiving the command to shut down, the method can determine whether an indication of remaining power capacity at the electronic device exceeds a threshold value. The method can shut down the electronic device and, after shutting down the electronic device, in accordance with a determination that the indication of remaining power capacity exceeds the threshold value, automatically reboot the electronic device. In accordance with a determination that the indication of the remaining power capacity does not exceed the threshold value, automatically rebooting the electronic device can be foregone.

18 Claims, 4 Drawing Sheets

(56) References Cited

U.S. PATENT DOCUMENTS

| | | | |
|---|---|---|---|
| 6,809,724 | B1 | 10/2004 | Shiraishi et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,121,656 | B2 | 2/2012 | Lmai |
| 8,271,057 | B2 | 9/2012 | Levine et al. |
| 8,335,549 | B2 | 12/2012 | Lee |
| 8,395,518 | B2 | 3/2013 | Toba |
| 8,479,122 | B2 | 7/2013 | Hotelling et al. |
| 8,639,291 | B1 | 1/2014 | Gailloux et al. |
| 8,686,682 | B2 | 4/2014 | Eager et al. |
| 10,228,751 | B2 | 3/2019 | Andrews |
| 2002/0181333 | A1 | 12/2002 | Ito et al. |
| 2004/0070371 | A1 | 4/2004 | Chern et al. |
| 2004/0070511 | A1 | 4/2004 | Kim |
| 2004/0177242 | A1* | 9/2004 | Erickson ............ H04L 12/12 713/2 |
| 2006/0197753 | A1 | 9/2006 | Hotelling |
| 2007/0239920 | A1 | 10/2007 | Frid |
| 2008/0079589 | A1 | 4/2008 | Blackadar |
| 2010/0081485 | A1 | 4/2010 | Velhal et al. |
| 2010/0313042 | A1 | 12/2010 | Shuster |
| 2011/0059769 | A1 | 3/2011 | Brunolli |
| 2011/0154007 | A1 | 6/2011 | Juvonen |
| 2011/0246801 | A1 | 10/2011 | Seethaler et al. |
| 2011/0260691 | A1 | 10/2011 | Ishibashi et al. |
| 2011/0316769 | A1 | 12/2011 | Boettcher et al. |
| 2012/0047380 | A1 | 2/2012 | Nurmi |
| 2012/0096373 | A1 | 4/2012 | Aguera y Arcas et al. |
| 2012/0185684 | A1 | 7/2012 | Lee et al. |
| 2012/0239949 | A1 | 9/2012 | Kalyanasundaram et al. |
| 2013/0244633 | A1 | 9/2013 | Jacobs et al. |
| 2014/0015682 | A1 | 1/2014 | Ratzlaff et al. |
| 2014/0068310 | A1* | 3/2014 | Sultenfuss ............ G06F 1/28 713/340 |
| 2014/0075220 | A1 | 3/2014 | Song |
| 2015/0007049 | A1 | 1/2015 | Langlois |
| 2015/0102992 | A1 | 4/2015 | Klement et al. |
| 2015/0148109 | A1 | 5/2015 | Gupta et al. |
| 2015/0185849 | A1 | 7/2015 | Levesque et al. |
| 2016/0041597 | A1 | 2/2016 | Graham et al. |
| 2016/0041606 | A1 | 2/2016 | Andrews et al. |
| 2016/0062540 | A1 | 3/2016 | Yang et al. |
| 2016/0066278 | A1 | 3/2016 | Zhao et al. |
| 2016/0187432 | A1 | 6/2016 | Masakawa |
| 2016/0299551 | A1 | 10/2016 | Wu et al. |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Notice of Allowance dated Oct. 25, 2018, for U.S. Appl. No. 14/799,370, filed Jul. 14, 2015, five pages.

Danish Search Report dated Apr. 20, 2017, for Application No. PA 2017 70089, eight pages.

Final Office Action dated Mar. 23, 2017, for U.S. Appl. No. 14/817,572, filed Aug. 4, 2015, 13 pages.

Final Office Action dated Apr. 27, 2017, for U.S. Appl. No. 14/799,370, filed Jul. 14, 2015, 19 pages.

International Search Report dated Jan. 29, 2016, for PCT Patent Application No. PCT/US2015/043487, eight pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Aug. 12, 2016, for U.S. Appl. No. 14/799,370, filed Jul. 14, 2015, fourteen pages.

Non-Final Office Action dated Sep. 12, 2016, for U.S. Appl. No. 14/817,572, filed Aug. 4, 2015, eight pages.

Non-Final Office Action dated Dec. 1, 2017, for U.S. Appl. No. 14/799,370, filed Jul. 14, 2015, 23 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Jul. 26, 2018, for U.S. Appl. No. 14/799,370, filed Jul. 14, 2015, six pages.

\* cited by examiner

SYSTEMS AND METHODS FOR POWER MANAGEMENT AT DEVICE SHUTDOWN

FIELD OF THE DISCLOSURE

This relates generally to power management of an electronic device.

BACKGROUND OF THE DISCLOSURE

An electronic device may require a power supply, such as a battery. Further, the electronic device may require that the power supply have a certain minimum voltage or be able to provide a minimum amount of power to the electronic device in order to function properly. Accordingly, an electronic device may monitor the voltage and/or power output of its power supply, and power down the electronic device if the voltage/power output falls below an acceptable level. The ability of the power supply to provide sufficient voltage/power can be based on factors such as temperature and the health of the battery. Sometimes, the temperature and the health of the battery can be such that the power needs of the electronic device can be higher than what the power supply is unable to provide. The electronic device, consequently, may power off in the presence of high demands or extreme conditions to preserve system integrity and long term operation. However, such shutdowns can be undesirable from the perspective of the user of the electronic device.

SUMMARY OF THE DISCLOSURE

Power control schemes for rebooting an electronic device in the event of certain types of power-off events (which can be caused by, e.g., temperature, power demand, and/or battery health) can be advantageous in returning an electronic device to a powered on state without requiring user interaction when sufficient battery power is available to operate the device. In some examples, the electronic device can be restarted in a low power state to prevent any additional power-off events.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Power control schemes for rebooting an electronic device in the event of certain types of power-off events (which can be caused by, e.g., temperature, power demand, and/or battery health) can be advantageous in returning an electronic device to a powered on state without requiring user interaction when sufficient battery power is available to operate the device. In some examples, the electronic device can be restarted in a low power state to prevent any additional power-off events.

Figure 1:
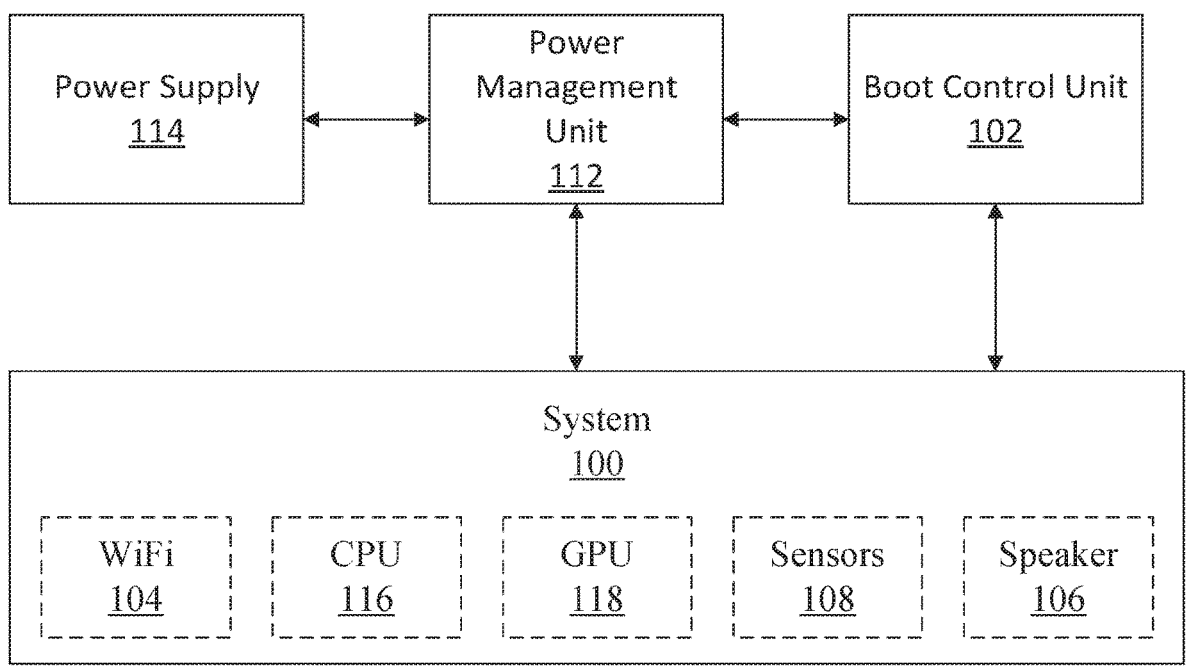
FIG. 1 is a block diagram illustrating an example of software and hardware interactions according to examples of the disclosure.

FIG. 1 is a block diagram illustrating an example software and hardware block diagram of an exemplary system 100 according to examples of the disclosure. Each block and/or each connection between the blocks in FIG. 1 may represent one or more hardware or software modules of an electronic device, such as a smartphone.

Boot control unit 102 may coordinate power-up and power down operations for a system including one or more modules, such as Wi-Fi 104, speaker 106, sensors 108, NFC 110, CPU 116, and GPU 118. Boot control unit 102 may also be responsible for initiating a boot-up sequence for powering on the system 100 based on inputs received from the power management unit 112 and/or one or more components of system 100. In some examples, a power management unit 112 may monitor, generally, the power delivery ability of the power supply 114 (e.g., a battery). In some examples, monitoring the power delivery ability of the power supply 114 can include monitoring the voltage level of the power supply and comparing the voltage level to a low voltage threshold. In some examples, the power delivery ability and/or voltage monitoring can occur while the device is in a powered-on state. The power management unit 112 may also be responsible for determining whether a charger (not shown) for recharging power supply 114 (e.g., a battery) is connected. The power management unit 112 may control the power supply 114 charging. The power management unit 112 may issue a command to shut down the system in accordance with a determination that the voltage level of the power supply 114 has dropped below the low voltage threshold. In some examples, the power management unit 112 may notify the boot control unit 102 that the voltage level has dropped below the voltage threshold and the boot control unit may initiate the shutdown process. In some examples, the shutdown process may initiate in the middle of a user interaction with the system 100. These shutdowns can be mitigated by providing an automatic reboot of the system in the event of a shutdown that occurs under certain conditions. For example, if the shutdown occurs due to a shutdown under extreme operating conditions (e.g., temperature, power demand, and/or battery health). In some examples, the boot control unit 102 can reboot the system automatically as long as the power supply 114 has sufficient power delivery ability remaining to continue operating the system 100. Exemplary power control schemes for handling different types of shutdowns, including automated reboot procedures, will be discussed further below with reference to FIGS. 2A-2B and 3.

Figure 2A:
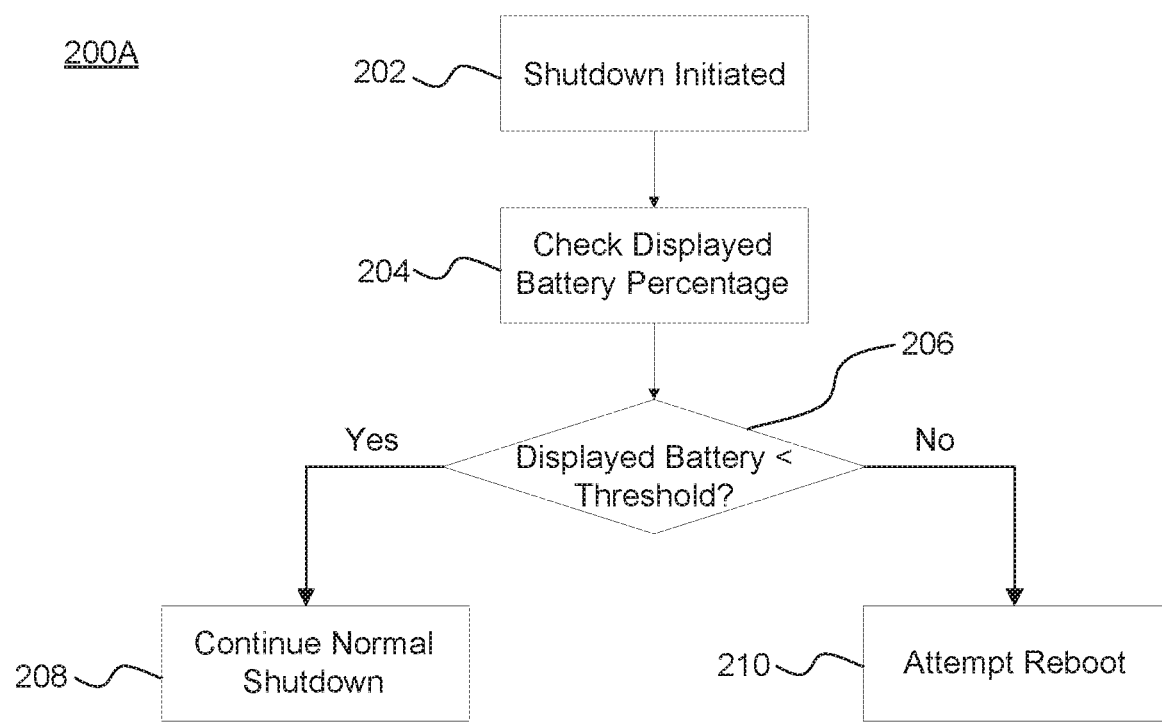
FIGS. 2A-2B are flow diagrams of power control schemes according to examples of the disclosure.

FIG. 2A illustrates a basic flow diagram of a power control scheme 200A according to examples of the disclosure. The power control scheme 200A can initiate a shutdown at 202. In some examples, the power control scheme 200A can initiate a shutdown 202 when a command to power down is received (e.g., from power management unit 112 above). In some examples, when the power control scheme 200A detects that the power delivery capability (e.g., remaining power capacity) of a power supply (e.g., power supply 114 above) has fallen below a power delivery capability threshold level, shutdown 202 can be initiated. In some examples, a battery voltage level can be compared against a threshold level as an indication of the power delivery capability. In some examples, even though significant charge may be present in the battery, the battery can lose the ability to deliver sufficient power (e.g., due to low temperature, high current demand, high battery impedance, and/or battery age, among other factors) to an electronic device. This inability to deliver sufficient power can cause the shutdown 202 to initiate despite a significant charge being present in the battery for continued operation. The power control scheme 200A can determine at 204 whether a displayed battery percentage (e.g., a displayed indication of remaining battery capacity on a user interface of an electronic device) exceeds a predetermined threshold. For example, the displayed battery percentage can be compared with a threshold battery value that a user might associate with a critically low battery capacity (e.g., a display indicating 10% remaining). Based on the determination at 204, the power control scheme 200A can decide at 206 what type of power-off sequence to perform. For example, if at 204 it is determined that the displayed battery percentage is below the threshold battery value, the shutdown can be considered a first type of power-off (e.g., a power-off when the display indicated 5% battery is remaining). In the above example, the power control scheme 200A can proceed with a normal shutdown sequence 208 for the device. As a result of a normal shutdown sequence, power control scheme 200A can enter a trap state where a user intervention (e.g., pressing a button or connecting to a battery charger) may be necessary to initiate a restart or reboot of an electronic device.

Figure 2B:
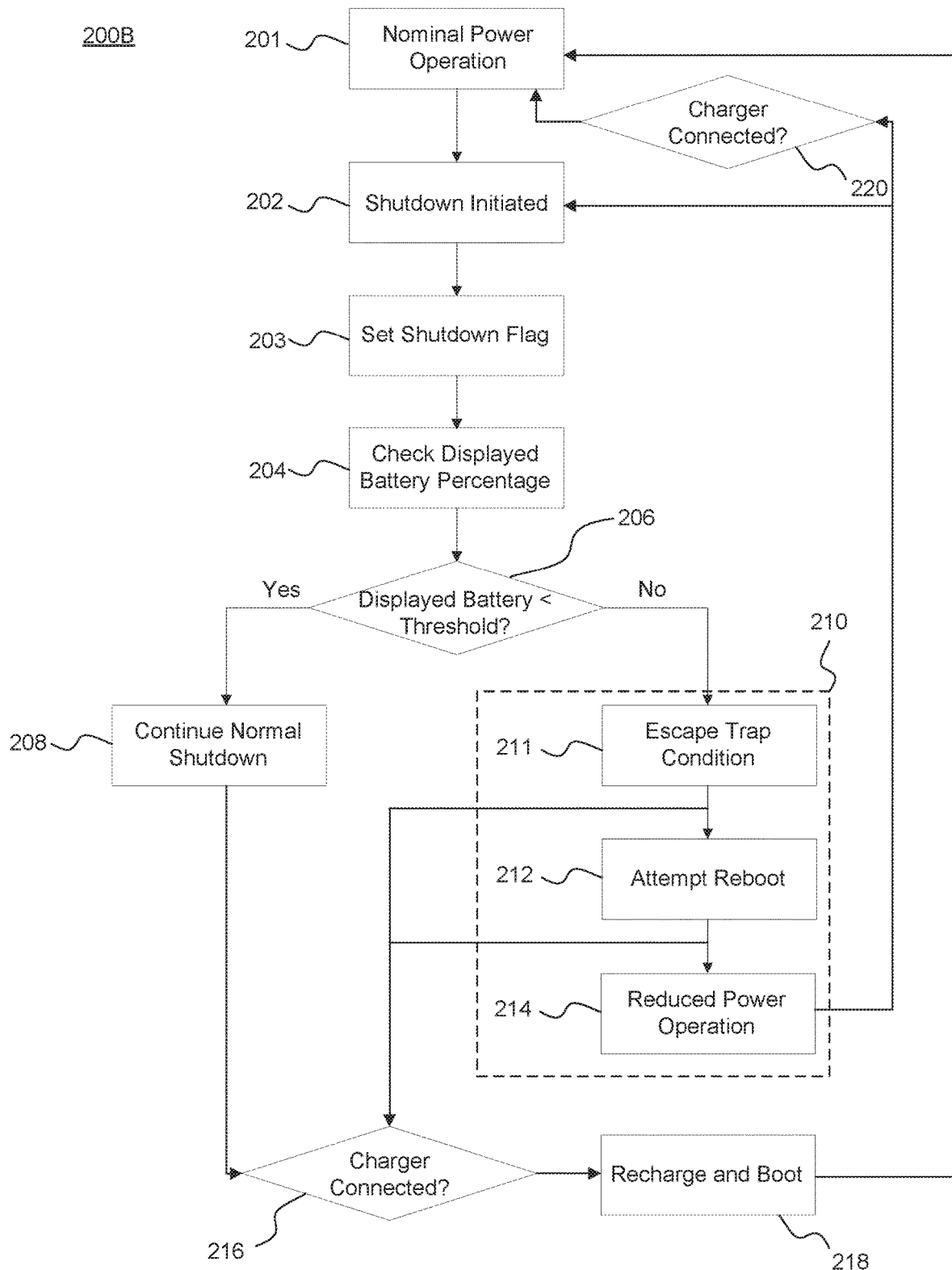

On the other hand, if it is determined that the displayed battery percentage is above the threshold battery value (e.g., a power-off when the display indicated 30% battery is remaining), the shutdown initiation 202 may be associated with a second type of power-off. In some examples, the second type of power-off may have been caused by extreme operating conditions such as temperature, power demand, and/or battery age. In some examples, the second type of power-off can be performed for system integrity preservation. A second type of power-off can occur, for example, when a battery is operating in a very cold environment, has a relatively high impedance (e.g., due to age, damage, amount of use, or other battery health-related factors) or as a result of a sudden increase in power consumption that can cause a temporary drop in battery voltage below a threshold voltage value. In some examples, when the second type of power-off is detected at 206, the power control scheme 200A can attempt a reboot without user intervention. Automatic rebooting 210 can improve a user's experience by returning an electronic device into a powered-on state when sufficient battery capacity remains for the device to operate, without requiring the user to manually press a power button on the electronic device to turn it back on. The automated reboot 210 can be performed without requiring the user to connect the electronic device to a battery charger or other power supply as well. In some examples, in the absence of rebooting 210, a user may be prevented from manually rebooting due to the presence of a trap condition that can be optionally set during the shutdown initiation 202. In some examples, the trap condition can be reset by connecting the device to a charger. According to the above, the power control scheme 200A of FIG. 2A describes a basic scheme for handling a second type of power-off with a reboot. FIG. 2B below illustrates one exemplary power control scheme with additional details regarding successfully rebooting the electronic device for both the first type of power-off events and the second type of power-off events.

Figure 3:
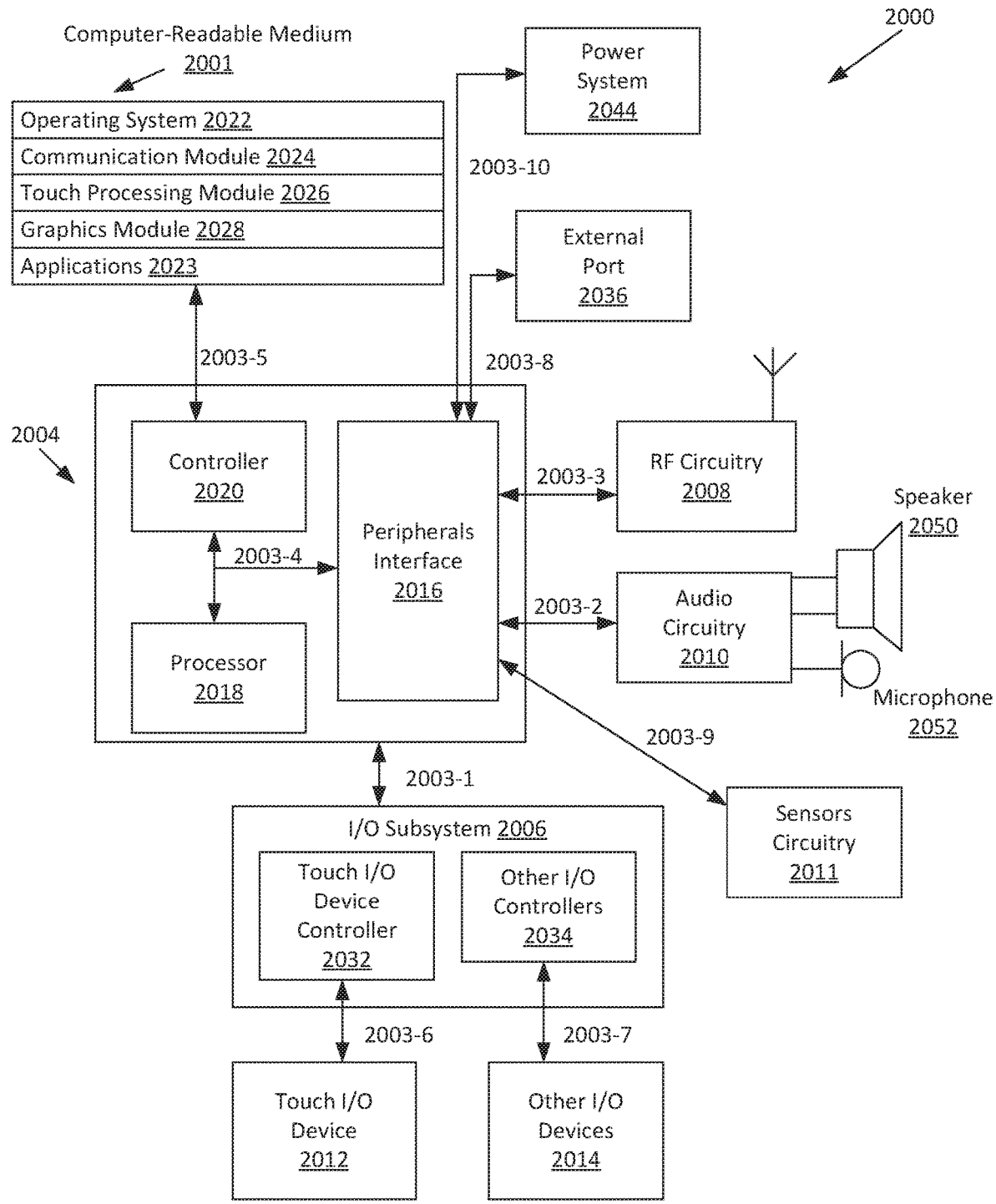
FIG. 3 is a block diagram illustrating an example of a system architecture that may be embodied within any portable or non-portable device according to examples of the disclosure.

FIG. 2B illustrates an exemplary detailed power control scheme 200B according to examples of the disclosure. In some examples, power control scheme 200B can begin in a state of nominal power operation 201. In the nominal power operation state, full operational capabilities of an associated electronic device and its system components (e.g., as shown in FIGS. 1 and 3) can be enabled and allowed to operate at nominal power levels. In some examples, the power control scheme 200B can initiate a shutdown at 202. In some examples, the power control scheme 200B can initiate a shutdown 202 when a command to power down is received (e.g., from power management unit 112 above). In some examples, when the power control scheme 200B detects that the power delivery capability (e.g., remaining power capacity) of a power supply (e.g., power supply 114 above) has fallen below a power delivery capability threshold level, shutdown 202 can be initiated. In some examples, a battery voltage level can be compared against a threshold level as an indication of the power delivery capability. In some examples, power control scheme 200B can set a shutdown flag at 203 as a result of the initiated shutdown 202. In some examples, power control scheme 200B can make a determination at 204 and 206 as to whether the shutdown is associated with an first type of power-off event or a second type of power-off event (as described for power control scheme 200A above). If it is determined by the power control scheme 200B at 206 that the power-off is a second type of power-off (e.g., the displayed battery percentage is greater than a threshold level), a second power-off flag (e.g., different from the shutdown flag 203) can be set or a counter can be incremented. In some examples, a second type of power-off event can correspond to a shutdown being initiated (e.g., at 202 above) when a displayed battery percentage is above a threshold battery percentage; otherwise, the shutdown can be associated with the first type of power-off event. In accordance with a determination that the shutdown is associated with a first type of power-off event, the power control scheme 200B can continue a normal shutdown operation at 208 as described above regarding power control scheme 200A. In the normal shutdown sequence 208, the power scheme 200B may be able to re-evaluate whether the power delivery capability of the battery is sufficient for continued operation. For example, calculation of remaining battery capacity may be suspended (e.g., at power management unit 112) once normal shutdown 208 begins to conserve the remaining battery charge. As described above, at 208 a user may initiate a restart or reboot by pressing a button (not shown) or by connecting to a charger at 216. In some examples, a reboot resulting from connection to a charger at 216 can be delayed until the battery is charged to a desired level at 218. In some examples, the power control scheme 200B can return to nominal power operation 201 once the desired charge level is reached.

Alternatively, if it is determined at 206 that a second type of power-off occurred, the power control scheme 200B can attempt an automatic reboot sequence 210 (e.g., as described more generally at 210 of power control scheme 200A above). In some examples, the automatic reboot sequence 210 can include escaping the trap condition 211, attempting a reboot 212, and a reduced power operation 214. In some examples, the shutdown flag set at 203 can create a trap condition that needs to be reset prior to initiating a reboot. In some examples, this trap condition can prevent the user from powering on the device until certain conditions are met (e.g., the battery is recharged to a specific level).

In some examples, the automatic reboot sequence 210 can be configured to exit the trap condition (e.g., by meeting one of the conditions for exiting the trap described above). In some examples, if the second power-off flag is set or counter is incremented at 206, the power control scheme 200B can escape the trap condition at 211 by re-enabling circuitry used to determine battery capacity (e.g., power management unit 112) and clearing the shutdown flag if the battery capacity exceeds a threshold capacity. For example, if the power delivery capability exceeds the power delivery capability threshold level (e.g., as described at 202 above), the shutdown flag 203 can become and remain cleared at 211. In some examples, if the cause of the apparent lack of power delivery capability has been removed (e.g., by increasing the battery temperature or reducing battery load), the shutdown flag can potentially be cleared and remain clear as described above. In some examples, determining whether the power delivery capability is sufficient can require a reset or reinitialization of low level circuitry (e.g., circuitry for measuring the power delivery ability of the battery) that can remain powered on even when the device is shut down. For example, hardware and/or firmware that maintains the shutdown flag 203 (e.g., power management unit 112 above) may remain powered on and stuck in the trap state (e.g., holding shutdown flag set). In some examples, the power control scheme 200B can disengage and re-engage power to the low level circuitry to allow a clearing of the shutdown flag 203 and recalculation of power delivery capability. In some examples, a Real-Time Clock timer can be used to schedule sufficient time between disengaging and re-engaging the power to the low level circuitry.

Once the trap condition has been escaped (e.g., the shutdown flag 203 is reset and remains cleared), the power control scheme 200B can attempt a reboot of the electronic device at 212. In some examples, if a charger is connected after 206 and prior to entering reduced power operation at 214, the attempt to reboot can be bypassed and rebooting can be paused until sufficient power delivery capability is available to boot in nominal power operation 201. In some examples, if the charger is briefly connected at 216 but disconnected prior to reaching sufficient capacity to reboot into nominal power operation 201, power control scheme 200B can attempt the automatic reboot sequence 210 again (not shown for simplicity) as described above and below. Similarly, if the charger is connected at 216 during the automatic reboot sequence 210 (e.g., after 211 or 212), the automatic reboot sequence can be bypassed in favor of attempting to recharge and reboot into nominal power operation via 218. Again, if the charger is briefly connected at 216 but disconnected prior to reaching sufficient capacity to reboot into nominal power operation 201, power control scheme 200B can attempt the automatic reboot sequence 210 again. In some examples, if a reboot attempt fails for any reason, automatic reboot sequence 210 can also be attempted again to try and achieve a successful reboot. In some examples, the number of unsuccessful attempts to reboot can be limited to prevent excessive power drain. Once the maximum number of unsuccessful attempts has been reached, the power control scheme 200B can return to the normal shutdown state 208.

In some examples, the automatic reboot sequence 210 can reboot the device into a reduced power operation state at 214. For example, in the reduced power operation state 214, a camera flash can be disabled, screen backlight levels can be reduced, clock rates for CPU and GPU (e.g., 116 and 118 above) can be reduced, and other power consumption sources can be reduced or disabled. In some examples, operating the device in the reduced power operation 214 can prevent additional power-off events from occurring by placing a limit on the maximum power consumption (and thus potentially preventing large voltage drops in the battery voltage). However, additional power-off events of the second type can still potentially occur during the reduced power operation 214. In some examples, the occurrence of a power-off event of the second type and/or reduced power operation 214 can optionally be indicated on the user interface of an electronic device. The number of power-off events of the second type and reboots that occur can be tracked, for example by maintaining a count of power-off events of the second type (e.g., system preservation power-off events). In some examples, the number of reboot cycles due to power-off events of the second type can be limited and the power control scheme 200B can cease attempting to perform the automated reboot sequence 210. In some examples, the count of power-off events of the second type can be reset once the battery (e.g., power supply 114 above) regains a sufficient amount of power as a result of charging to return to nominal power operation 201. In some examples, if a charger is connected 220 after a successful automatic boot sequence 210 and the device is operating in reduced power operation 214, the power control scheme 200B can return to nominal power operation 201 once a sufficient amount of power delivery capability is restored to the battery.

Attention is now directed towards examples of a system architecture that may be embodied within any portable or non-portable electronic device according to the examples of the disclosure including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, a wearable device (e.g., a smart watch) or any other system or device adaptable to the inclusion of system architecture 2000, including combinations of two or more of these types of devices. FIG. 3 is a block diagram of one example of system 2000 that generally includes one or more computer-readable mediums 2001, processing system 2004, I/O subsystem 2006, radio frequency (RF) circuitry 2008, audio circuitry 2010, sensors circuitry 2011 and power system 2044. These components may be coupled by one or more communication buses or signal lines 2003.

It should be apparent that the architecture shown in FIG. 3 is only one example architecture of system 2000, and that system 2000 could have more or fewer components than shown, or a different configuration of components. The various components shown in FIG. 3 can be implemented in hardware, software, firmware or any combination thereof, including one or more signal processing and/or application specific integrated circuits. System 200 can correspond to the electronic device in which the power control schemes of the disclosure are implemented.

RF circuitry 2008 can be used to send and receive information over a wireless link or network to one or more other devices and includes well-known circuitry for performing this function. RF circuitry 2008 and audio circuitry 2010 can be coupled to processing system 2004 via peripherals interface 2016. Interface 2016 can include various known components for establishing and maintaining communication between peripherals and processing system 2004. Audio circuitry 2010 can be coupled to audio speaker 2050 and microphone 2052 and can include known circuitry for processing voice signals received from interface 2016 to enable a user to communicate in real-time with other users. In some examples, audio circuitry 2010 can include a headphone jack (not shown). Sensors circuitry 2011 can be coupled to various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, and various system sensors which can sense remaining battery life, power consumption, processor speed, CPU load, and the like.

Peripherals interface 2016 can couple the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. In some examples, medium 2001 can be a non-transitory computer-readable storage medium. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 can run various software components stored in medium 2001 to perform various functions for system 2000. In some examples, the software components can include operating system 2022, communication module (or set of instructions) 2024, touch processing module (or set of instructions) 2026, graphics module (or set of instructions) 2028, and one or more applications (or set of instructions) 2030. Each of these modules and above noted applications can correspond to a set of instructions for performing one or more power control functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various examples. In some examples, medium 2001 may store a subset of the modules and data structures identified above. Furthermore, medium 2001 may store additional modules and data structures not described above.

Operating system 2022 can include various procedures, sets of instructions, software components and/or drivers for controlling and managing general system tasks (e.g., memory management, storage device control, power management, etc.) and facilitates communication between various hardware and software components.

Communication module 2024 can facilitate communication with other devices over one or more external ports 2036 or via RF circuitry 2008 and can include various software components for handling data received from RF circuitry 2008 and/or external port 2036.

Graphics module 2028 can include various known software components for rendering, animating and displaying graphical objects on a display surface. In examples in which touch I/O device 2012 is a touch sensing display (e.g., touch screen), graphics module 2028 can include components for rendering, displaying, and animating objects on the touch sensing display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 can include various software components for performing various tasks associated with touch I/O device 2012 including but not limited to receiving and processing touch input received from I/O device 2012 via touch I/O device controller 2032.

I/O subsystem 2006 can be coupled to touch I/O device 2012 and one or more other I/O devices 2014 for controlling or performing various functions. Touch I/O device 2012 can communicate with processing system 2004 via touch I/O device controller 2032, which can include various components for processing user touch input (e.g., scanning hardware). One or more other input controllers 2034 can receive/send electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 can display visual output to the user in a GUI. The visual output may include text, graphics, video, and any combination thereof. Some or all of the visual output may correspond to user-interface objects. Touch I/O device 2012 can form a touch sensing surface that accepts touch input from the user. Touch I/O device 2012 and touch screen controller 2032 (along with any associated modules and/or sets of instructions in medium 2001) can detect and track touches or near touches (and any movement or release of the touch) on touch I/O device 2012 and can convert the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

In examples for which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 can also include power system 2044 for powering the various hardware components and may include a power management system, one or more power sources (e.g., a battery), a recharging system, a power failure detection circuit, a power converter or inverter, a power status indicator and any other components typically associated with the generation, management and distribution of power in portable devices. In some examples, the logic and/or circuitry for performing the power controlling schemes of the disclosure can be included in power system 2044, which can be communicatively coupled via link 2003-10 to the remainder of system 2000.

In some examples, peripherals interface 2016, one or more processors 2018, and memory controller 2020 may be implemented on a single chip, such as processing system 2004. In some other examples, they may be implemented on separate chips.

Thus, according to the above, power control schemes for rebooting an electronic device in the event of certain types of power-off events can be advantageous in returning an electronic device to a powered on state without requiring user interaction when sufficient battery power is available to operate the device. In some examples, the electronic device can be restarted in a low power state to prevent any additional power-off events.

Therefore, according to the above, some examples of the disclosure are directed to a method comprising: receiving a command to shut down an electronic device based on a measurement of power delivery to the electronic device; after receiving the command to shut down, determining whether an indication of remaining power capacity at the electronic device exceeds a threshold value; shutting down the electronic device; and after shutting down the electronic device: in accordance with a determination that the indication of remaining power capacity exceeds the threshold value, automatically rebooting the electronic device; and in accordance with a determination that the indication of the remaining power capacity does not exceed the threshold value, forgoing automatically rebooting the electronic device. Additionally or alternatively to one or more of the examples disclosed above, in some examples, the indication of remaining power capacity at the electronic device is an indication of a percentage of battery displayed in a user interface of the electronic device. Additionally or alternatively to one or more of the examples disclosed above, in some examples, rebooting the electronic device comprises escaping a trap condition and entering a reduced power operational state for the electronic device.

Some examples of the disclosure are directed to a non-transitory computer readable storage medium having stored therein instructions, which when executed by an electronic device with memory and one or more processors, cause the electronic device to perform a method comprising: receiving a command to shut down an electronic device based on a measurement of power delivery to the electronic device; after receiving the command to shut down, determining whether an indication of remaining power capacity at the electronic device exceeds a threshold value; shutting down the electronic device; and after shutting down the electronic device: in accordance with a determination that the indication of remaining power capacity exceeds the threshold value, automatically rebooting the electronic device; and in accordance with a determination that the indication of the remaining power capacity does not exceed the threshold value, forgoing automatically rebooting the electronic device.

Some examples of the disclosure are directed to an electronic device, comprising: a processor to execute instructions; and a memory coupled to the processor and configured to store instructions, which when executed by the processor, cause the processor to perform a method comprising: receiving a command to shut down an electronic device based on a measurement of power delivery to the electronic device; after receiving the command to shut down, determining whether an indication of remaining power capacity at the electronic device exceeds a threshold value; shutting down the electronic device; and after shutting down the electronic device: in accordance with a determination that the indication of remaining power capacity exceeds the threshold value, automatically rebooting the electronic device; and in accordance with a determination that the indication of the remaining power capacity does not exceed the threshold value, forgoing automatically rebooting the electronic device.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method comprising:
   receiving a command from a power management unit of an electronic device to shut down the electronic device based on a measurement of power delivery to the electronic device, wherein the measurement of power delivery to the electronic device is different than a remaining power capacity of the electronic device;
   after receiving the command to shut down and before shutting down the electronic device, determining whether an indication of the remaining power capacity at the electronic device exceeds a threshold value, wherein the indication of the remaining power capacity is different than the measurement of the power delivery to the electronic device, and wherein the indication of the remaining power capacity was displayed by the electronic device when the command to shut down the electronic device was received;
   shutting down the electronic device based on the command to shut down; and
   after shutting down the electronic device:
     in accordance with a determination that the indication of remaining power capacity exceeds the threshold value, automatically rebooting the electronic device; and
     in accordance with a determination that the indication of the remaining power capacity does not exceed the threshold value, forgoing automatically rebooting the electronic device;
   wherein the command to shut down the electronic device based on the measurement of the power delivery to the electronic device is generated due to at least one of a power demand on a battery of the electronic device, a health of the battery of the electronic device, or a temperature of the battery of the electronic device.

2. The method of claim 1, wherein the indication of remaining power capacity at the electronic device is an indication of a percentage of battery displayed in a user interface of the electronic device.

3. The method of claim 1, wherein rebooting the electronic device comprises escaping a trap condition and entering a reduced power operational state for the electronic device.

4. The method of claim 1, wherein forgoing automatically rebooting the electronic device includes entering a trap state in which activation of a power button of the electronic device by a user will cause the electronic device to reboot.

5. The method of claim 1, wherein automatically rebooting the electronic device includes:
while the electronic device is shut down:
periodically monitoring the power delivery capability to the electronic device;
waiting until the power delivery capability of the electronic device is sufficient; and
in response to the power delivery capability of the electronic device becoming sufficient, initiating the rebooting of the electronic device.

6. The method of claim 1, further comprising:
attempting automatic reboots of the electronic device a plurality of times; and
in response to the plurality of times equaling a threshold number, ceasing attempting the automatic reboots of the electronic device.

7. A non-transitory computer readable storage medium having stored therein instructions, which when executed by an electronic device with memory and one or more processors, cause the electronic device to perform a method comprising:
receiving a command from a power management unit of the electronic device to shut down the electronic device based on a measurement of power delivery to the electronic device, wherein the measurement of power delivery to the electronic device is different than a remaining power capacity of the electronic device;
after receiving the command to shut down and before shutting down the electronic device, determining whether an indication of the remaining power capacity at the electronic device exceeds a threshold value, wherein the indication of the remaining power capacity is different than the measurement of the power delivery to the electronic device, and wherein the indication of the remaining power capacity was displayed by the electronic device when the command to shut down the electronic device was received;
shutting down the electronic device based on the command to shut down; and
after shutting down the electronic device:
in accordance with a determination that the indication of remaining power capacity exceeds the threshold value, automatically rebooting the electronic device; and
in accordance with a determination that the indication of the remaining power capacity does not exceed the threshold value, forgoing automatically rebooting the electronic device;
wherein the command to shut down the electronic device based on the measurement of the power delivery to the electronic device is generated due to at least one of a power demand on a battery of the electronic device, a health of the battery of the electronic device, or a temperature of the battery of the electronic device.

8. The non-transitory computer readable storage medium of claim 7, wherein the indication of remaining power capacity at the electronic device is an indication of a percentage of battery displayed in a user interface of the electronic device.

9. The non-transitory computer readable storage medium of claim 7, wherein rebooting the electronic device comprises escaping a trap condition and entering a reduced power operational state for the electronic device.

10. The non-transitory computer readable storage medium of claim 7, wherein forgoing automatically rebooting the electronic device includes entering a trap state in which activation of a power button of the electronic device by a user will cause the electronic device to reboot.

11. The non-transitory computer readable storage medium of claim 7, wherein automatically rebooting the electronic device includes:
while the electronic device is shut down:
periodically monitoring the power delivery capability to the electronic device;
waiting until the power delivery capability of the electronic device is sufficient; and
in response to the power delivery capability of the electronic device becoming sufficient, initiating the rebooting of the electronic device.

12. The non-transitory computer readable storage medium of claim 7, wherein the method further comprises:
attempting automatic reboots of the electronic device a plurality of times; and
in response to the plurality of times equaling a threshold number, ceasing attempting the automatic reboots of the electronic device.

13. An electronic device comprising:
a processor to execute instructions; and
a memory coupled to the processor and configured to store instructions, which when executed by the processor, cause the processor to perform a method comprising:
receiving a command from a power management unit of the electronic device to shut down the electronic device based on a measurement of power delivery to the electronic device, wherein the measurement of power delivery to the electronic device is different than a remaining power capacity of the electronic device;
after receiving the command to shut down and before shutting down the electronic device, determining whether an indication of the remaining power capacity at the electronic device exceeds a threshold value, wherein the indication of the remaining power capacity is different than the measurement of the power delivery to the electronic device, and wherein the indication of the remaining power capacity was displayed by the electronic device when the command to shut down the electronic device was received;
shutting down the electronic device based on the command to shut down; and
after shutting down the electronic device:
in accordance with a determination that the indication of remaining power capacity exceeds the threshold value, automatically rebooting the electronic device; and
in accordance with a determination that the indication of the remaining power capacity does not exceed the threshold value, forgoing automatically rebooting the electronic device;
wherein the command to shut down the electronic device based on the measurement of the power delivery to the electronic device is generated due to at least one of a power demand on a battery of the electronic device, a health of the battery of the electronic device, or a temperature of the battery of the electronic device.

14. The electronic device of claim 13, wherein the indication of remaining power capacity at the electronic device is an indication of a percentage of battery displayed in a user interface of the electronic device.

15. The electronic device of claim 13, wherein rebooting the electronic device comprises escaping a trap condition and entering a reduced power operational state for the electronic device.

16. The electronic device of claim 13, wherein forgoing automatically rebooting the electronic device includes entering a trap state in which activation of a power button of the electronic device by a user will cause the electronic device to reboot.

17. The electronic device of claim 13, wherein automatically rebooting the electronic device includes:
while the electronic device is shut down:
periodically monitoring the power delivery capability to the electronic device;
waiting until the power delivery capability of the electronic device is sufficient; and
in response to the power delivery capability of the electronic device becoming sufficient, initiating the rebooting of the electronic device.

18. The electronic device of claim 13, wherein the method further comprises:
attempting automatic reboots of the electronic device a plurality of times; and
in response to the plurality of times equaling a threshold number, ceasing attempting the automatic reboots of the electronic device.

* * * * *